United States Patent

[11] 3,537,548

| [72] | Inventor | Patrick R. Jeppesen<br>Seattle, Washington |
|---|---|---|
| [21] | Appl. No. | 755,566 |
| [22] | Filed | Aug. 27, 1968 |
| [45] | Patented | Nov. 3, 1970 |
| [73] | Assignee | Intrasystems Security Associates, Inc.<br>Seattle, Washington |

[54] AUTOMOBILE IMPOUNDING APPARATUS
5 Claims, 4 Drawing Figs.

[52] U.S. Cl. .................................................. 188/32,
70/225, 105/368, 248/119
[51] Int. Cl. ........................................................ B60t 3/00
[50] Field of Search ............................................ 188/29, 32;
105/368(T), 369(A); 70/18, 19, 225; 248/119;
280/150, 179; 301/37(AT)

[56] References Cited
UNITED STATES PATENTS

| 340,880 | 4/1886 | Johnson ...................... | 188/32 |
| 1,174,410 | 3/1916 | Hajasok et al............. | 188/32 |
| 1,396,067 | 11/1921 | Setkowski .................. | 70/225 |
| 2,844,954 | 7/1958 | Marugg ...................... | 188/32X |
| 2,960,857 | 11/1960 | Winter ........................ | 70/225X |

Primary Examiner—George E. A. Halvosa
Attorney—Seed, Berry and Dowrey

ABSTRACT: A locking mechanism is attached to a vehicle wheel to prevent movement of the vehicle by impeding rotation of the wheel. The locking mechanism employs wheel blocks to abut the periphery of the wheel and a shield to prevent removal of a hub cap. The blocks and shield are bound tightly to the wheel by a link chain.

Patented Nov. 3, 1970
3,537,548
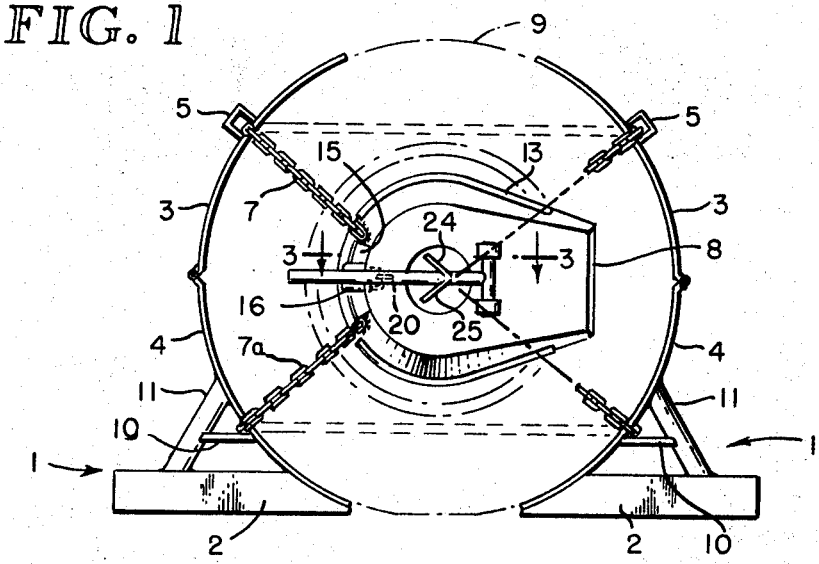
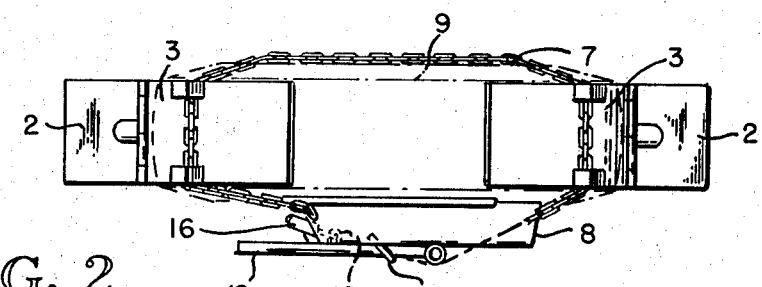
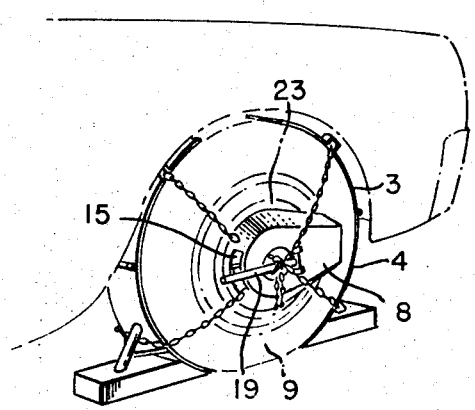
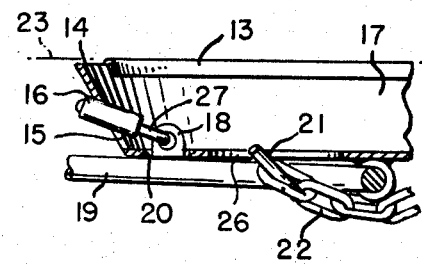
PATRICK R. JEPPESEN
INVENTOR.
BY
ATTORNEYS

AUTOMOBILE IMPOUNDING APPARATUS

BACKGROUND OF THE INVENTION

The present invention relates generally to vehicle wheel locking mechanisms. In particular, the present invention relates to locking apparatus for latching to an automobile wheel for impounding the vehicle or otherwise preventing its movement.

Numerous circumstances exist in which it is desirable to prevent movement of a vehicle, particularly a motor vehicle such as an automobile. An example is the lawful detention of an automobile by the police or a lien holder. Another example, is where an automobile is on public display requiring measures to prevent accidental movements of the automobile that could cause injury to a spector. In each instance, it is desired to immobilize the car independently from its normal locking and breaking mechanism in a manner which is unlikely to damage the automobile and which is reasonably convenient.

Accordingly, it is an object of the present invention to devise means for displaying a vehicle by attaching apparatus to a wheel of the vehicle. It is an object to provide a locking mechanism that is adapted to fit to wheels of various diameters. Another object of the present invention is to prevent escape from the locking mechanism by including means to discourage not only removal of the locking mechanism from the vehicle wheel, but also to discourage removal of the wheel from the vehicle. In attaining the foregoing object a guard is positioned adjacent the hub of the wheel, wheel blocks are positioned adjacent the periphery of the wheel and together they are bound about the vehicle wheel by a chain. Still a further object of the present invention is to provide a shield for a padlock used to secure the chain to the hub guard to minimize tampering with the lock. It is of course an object of the present invention to improve automobile impounding apparatus.

DESCRIPTION OF THE DRAWING

Other objects and features of the present invention will be apparent from a further reading of the description of the invention in connection with the drawings which are:

FIG. 1 is a side elevational view of the present locking apparatus disposed generally as when attached to the wheel of a vehicle with a portion of the chain cut away;

FIG. 2 is a top plan view of the locking mechanism disposed generally as when attached to a vehicle wheel again with a portion of the chain cut away;

FIG. 3 is a cross-sectional view taken along line 3–3 in FIG. 1;

FIG. 4 is a perspective view of the locking mechanism disposed generally as when attached to an automobile wheel.

DESCRIPTION OF THE INVENTION

The present invention is a locking apparatus or mechanism which is adapted to be attached to a wheel of a vehicle to prevent the rotation of that wheel. This of course disables or immobilizes, the vehicle itself. The locking apparatus herein disclosed is primarily designed for attachment to wheels such as the pneumatic tire commonly employed on present day automobiles. The apparatus is, however, capable of attaching to wheels on trucks, trailers, wagons, farm vehicles and other motor and nonmotor vehicles. As pointed out earlier, numerous circumstances exist in which the use of the present locking apparatus would be highly advantageous. Another example is to protect automobile trailers left on open, unattended lots while not in use.

The locking apparatus is comprised of wheel stop means, hub guard means, linking means, and winch means. The wheel stop means includes devices which attach to a wheel or butts against a wheel to impede rotation thereof. When coupled to the wheel, the stop means impedes rotation of that wheel over the surface of which it is resting.

The hub guard means is a shielding device, such as a steel plate, positioned adjacent the hub of the wheel and axle. The guard impedes removal of that wheel and also provides a convenient platform for the winch means.

The winch means includes means capable of engaging with a chain attached to both the hub guard and the wheel stop means. The chain being the linking means. The winch means is used to securely tighten or squeeze the chain about the wheel thereby securely abutting the wheel stop and the hub guard to the wheel. The present locking apparatus is designed to surround and tightly hug a vehicle wheel rather than to mechanically connect to or through the wheel. The present device causes a minimum disturbance of the vehicle to which it is attached.

As mentioned, the wheel stop means is a device attached to the wheel or abutting the wheel which would prevent its normal rotation. The wheel stop could include a rod tightly bound to the wheel to protrude beyond its periphery thereby preventing normal rotation. The FIGS. illustrate, however, a preferred embodiment of a vehicle wheel stop. In the preferred embodiment two wheel stops are used. The two wheel stops prevent both forward and backward movement of the vehicle without encountering the possiblility of damaging the vehicle itself. This illustrates the feature of the presently preferred embodiment wherein the wheel stop means interact between the wheel and the ground rather than between the wheel and the frame of the vehicle. The latter arrangement could possibly cause damage to either the wheel or the vehicle frame in the event the vehicle was moved while the mechanism was attached.

The preferred wheel stop 1 embodiment includes base member 2 which rests on the same surface as the wheel to which it is to abut. The wheel stop includes an upper cradle 3 and a lower cradle 4. The abutting surfaces of the cradles are generally curved to approximate an arc of a circle. The abutting surfaces are intended to match generally the circular peripheral surface of a vehicle wheel. The cradles are hinged together to enable the wheel stop to be expanded or contracted to abut wheels of different diameters.

The width selected for the cradle in the preferred embodiment matches substantially the width of tires commonly employed on American automobiles. Because of the hinged cradles, abutting surfaces of the stops can be reduced to conform to smaller vehicle wheels as found on many foreign cars or expanded to conform to larger wheels as found on trucks and trailers. For these various size wheels, the fact that the width of the cradle is wider or narrower than the width of the tire doesn't effect the operation of the locking mechanism.

The upper cradle includes a welded eyelet 5 adapted for the insertion therethrough of chain 7. The chain binds together the stop means 1, hub guard 8 and tire 9. The chain 7, i.e. linking means, also passes through an eyelet on the lower cradle formed generally from the horizontal bar 10 and strut 11 supporting the lower cradle 4. The upper and lower eyelets provide means for preventing the chain from being slipped off a wheel to which the locking apparatus is attached.

The hub guard means is bowl shaped member 8 as shown in the FIGS. The rubber bumper 13 is placed about the lip 14 of the bowl member to prevent scratching or otherwise abraiding the hub, axle or wheel of the vehicle which the guard abuts. One reason for the bowl shape is to minimize the area of the bowl in contact with the hub thereby minimizing abrasion of the wheel. Also, the bowl shape enables the guard to act as a shield to prevent tampering with a padlock. A hole 15 is provided in the side of the hub guard for this purpose. The lock 16 fits through the hole 15 into the hollow 17 of the bowl member. There it engages with eyelet 18 on winch arm 19 which extends through slot 20 in the top of the bowl member.

The padlock 16 may employ any operating mechanism as long as the mechanism is accessible from outside the bowl. The drawings show a combination lock operated by a dial at the base of the lock. Placing the lock within the hollow of the bowl effectively prevents the bolt 27 from being severed in an attempt to escape the locking mechanism.

The winch arm 19 is pivotally mounted on the hub guard 8. It includes the fork members 21 mounted thereon. The forks 21 are designed to engage with a link 22 of chain 7 used to bind the wheel stop 1 and hub guard 8 to to a wheel 9. The winch arm also includes the eyelet 18 which is aligned to fit through slot 20 in the bowl member so that arm 19 can be locked to hub guard 8. The winch arm provides means for drawing the chain tightly about a vehicle wheel thereby tightly binding the wheel stops and the hub guard to the wheel.

The linking means is the link chain 7. The diameter of the chain or its links 22 is chosen to provide sufficient strength for the locking mechanism. The size of the forks 21 on the winch arm is selected to enable them to be inserted through the eye of the individual links in the chain. Two link chains are employed, upper chain 7 and lower chain 7a. Each of the chains is anchored at one end to the hub guard as shown.

The locking mechanism is attached to a wheel by first expanding the hinged upper cradle 3 of the wheel stops sufficiently to enable the stops 1 to abut the periphery of the particular wheel involved, e.g. a car tire. The wheel stops are then positioned so as to abut the peripheral surface of the tire 9. Next one chain, e.g. the lower 7a, is threaded through the lower eyelet on one stop, draped around the tire, threaded through the lower eyelet on the second stop and stretched back toward the hub guard.

The hub guard is then manually raised to a position to abut the hub cap 23 of the wheel 9. Now the upper chain 7 is threaded through the upper eyelets on the stops and draped around the tire and brought back to the hub guard generally in the manner as the lower chain 7a.

Initially the chains are manually drawn tight about the wheel with a link of the lower chain 7a being hooked to the upper fork prong 24 on the winch arm 19. At this point, the arm is held at a position such that it extends generally parallel to the axes of rotation of the wheel. A link from the upper chain 7 is hooked to the lower fork prong 25. Thereafter, arm 19 is pivoted or rotated toward the hub guard 8 in a direction that increases the tension in the chains 7 and 7a. The circular opening 26 in the hub guard 8 is provided to accommodate the fork 21 and the chains 7 and 7a so that eyelet 18 may extend through slot 20 for engagement with padlock 16. Also, opening 26 impedes removal of the chains from the fork by allowing the fork to extend into the hollow 17. The padlock is then inserted through hole 15 and bolt 27 is threaded through eyelet 18 and locked. The base of padlock 16 extends through hole 15 exposing the padlock operating mechanism, in this case combination tumblers.

With the locking mechanism coupled to a vehicle wheel, the vehicle is immobilized. Attempts to move the vehicle do not result in any component of the mechanism contacting the frame of the vehicle. This is because the wheel stops interact between the wheel component of the mechanism and the surface on which the wheel rides to prevent rotation. A wheel stop interacting with the frame of the vehicle could cause damage if the vehicle is attempted to be moved without knowledge of the presence of the locking mechanism. Of course, the threat of damage to the vehicle is a deterrent at least for the owner, against movement of the vehicle.

It is believed that the invention will have been clearly understood from the foregoing detailed description of my now preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

I claim:

1. A vehicle wheel locking mechanism comprising:
   a wheel stop for abutting the outer periphery of a vehicle wheel and the wheel supporting surface for impeding the rotation of the wheel;
   a hub guard abutting the hub of the vehicle wheel, adjustable linking means for coupling said wheel stop and hub guard together and for securing same in cooperative relationship while abutting the vehicle wheel; and
   a winch arm mounted on said hub guard engageable with said linking means for binding said guard and said wheel stop to the hub and periphery of the vehicle wheel.

2. The mechanism of claim 1 wherein said wheel stop includes upper and lower hinged cradles for abutting with vehicle wheels of different diameters.

3. The mechanism of claim 1 further including locking means engageable with said hub guard and winch arm for latching said arm to said guard.

4. The mechanism of claim 3 wherein said hub guard is a bowl shaped member permitting positioning of said locking means between said bowl member and an abutting wheel to shield said locking means.

5. The mechanism of claim 3 including two of said wheel stops wherein:
   a wheel stop includes upper and lower cradles having generally a curved shape with the upper cradle hinged to the lower, each cradle having eyelet means for accommodating said linking means, wherein;
   said linking means includes two link chains anchored at one end to said hub guard, wherein;
   said hub guard includes a bowl shaped member having bumper means mounted on the lip thereof for abutting the hub of a vehicle wheel, wherein;
   said winch arm including means for engaging the unanchored ends of said chains and eyelet means aligned for insertion through a slot in said bowl member into the hollow thereof, wherein; and
   said bowl member includes means for permitting said locking means to engage the winch arm eyelet means in said hollow locking said hub guard to said winch arm while in a shielded position.